Figure 6:
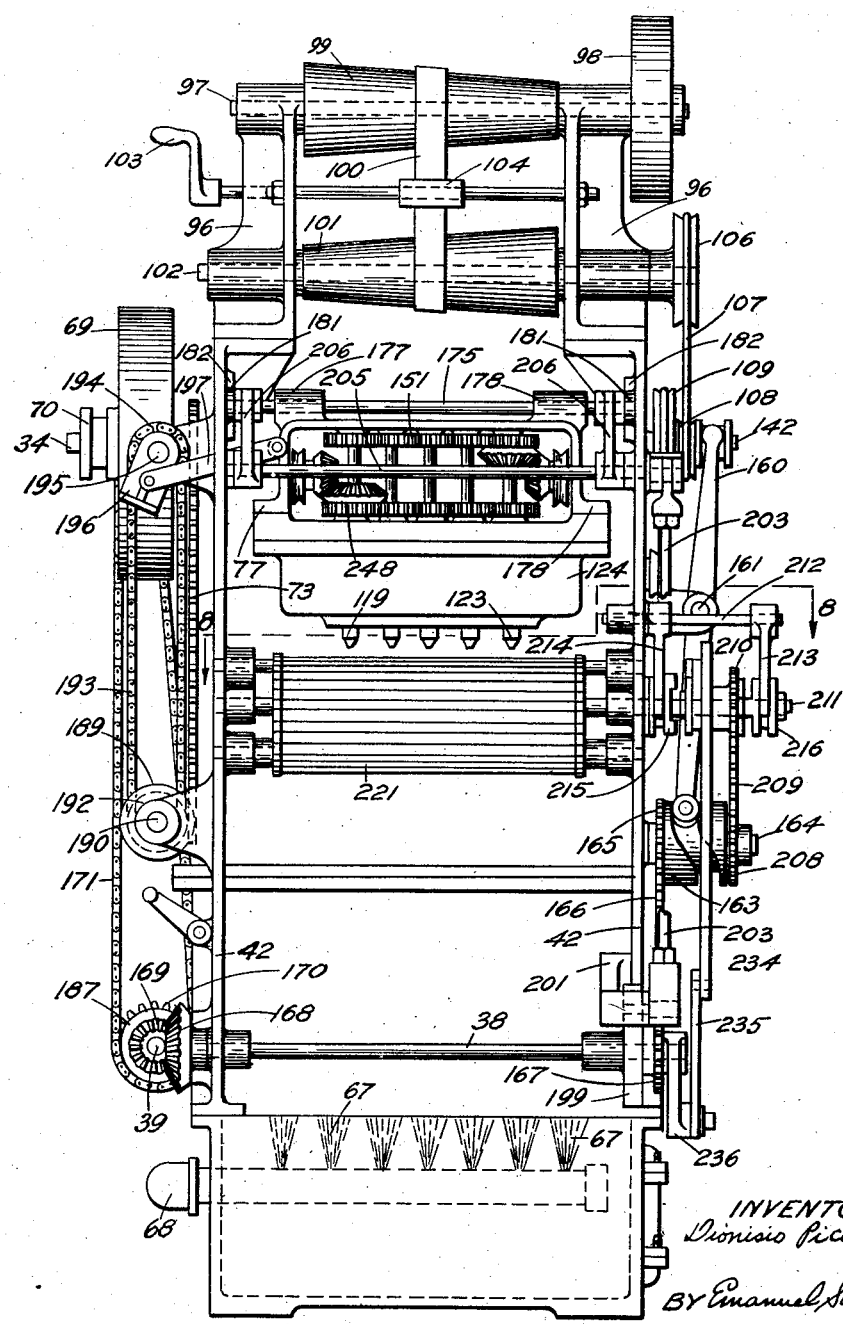

Feb. 22, 1927. 1,618,471
D. PICCARDO
CANDY COATING MACHINE
Filed Oct. 15, 1923      8 Sheets-Sheet 1
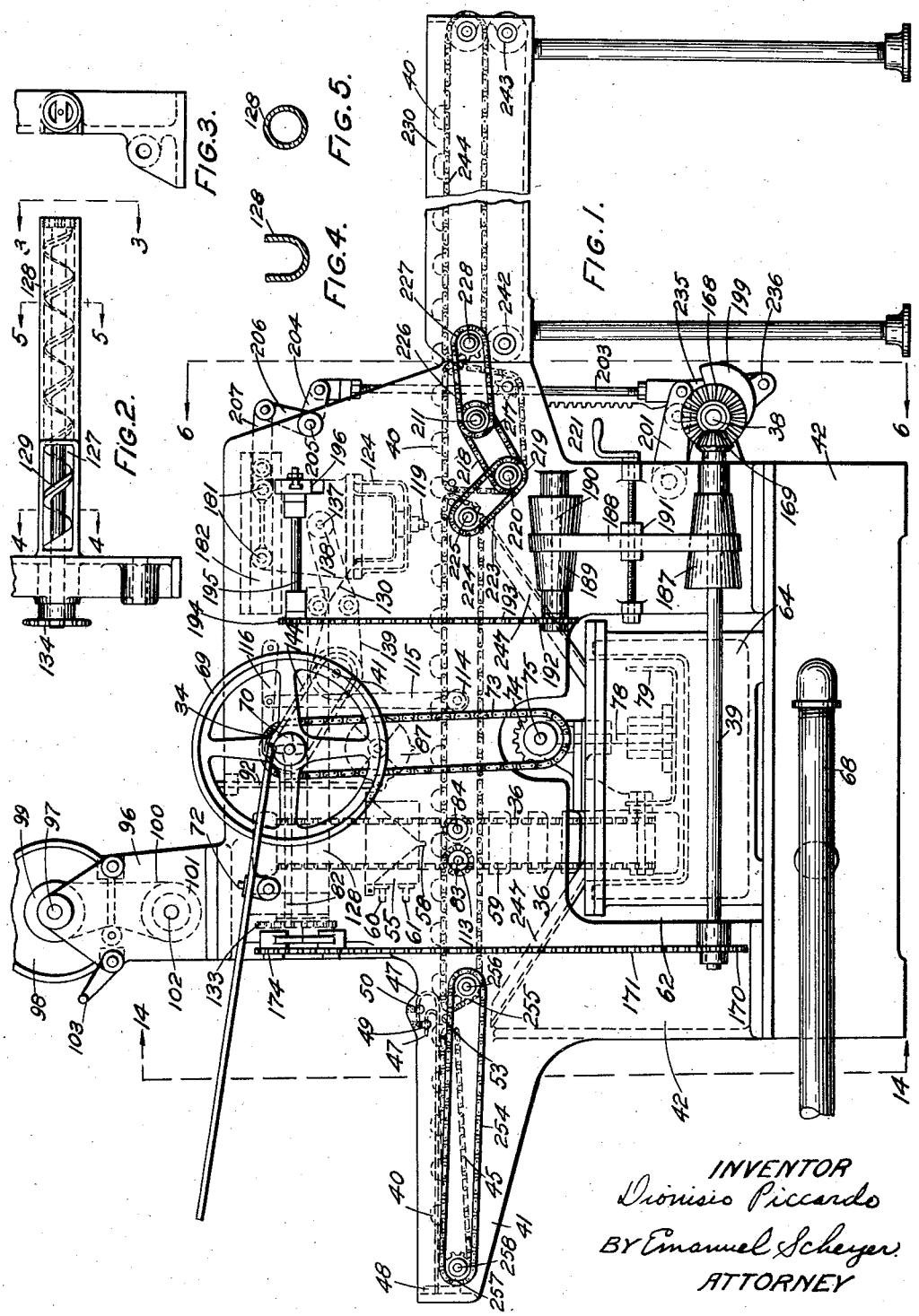
INVENTOR
Dionisio Piccardo
BY Emanuel Scheyer
ATTORNEY Feb. 22, 1927.

D. PICCARDO

CANDY COATING MACHINE

Filed Oct. 15, 1923

1,618,471

8 Sheets-Sheet 2

INVENTOR
Dionisio Piccardo

BY Emanuel Scheyer
ATTORNEY

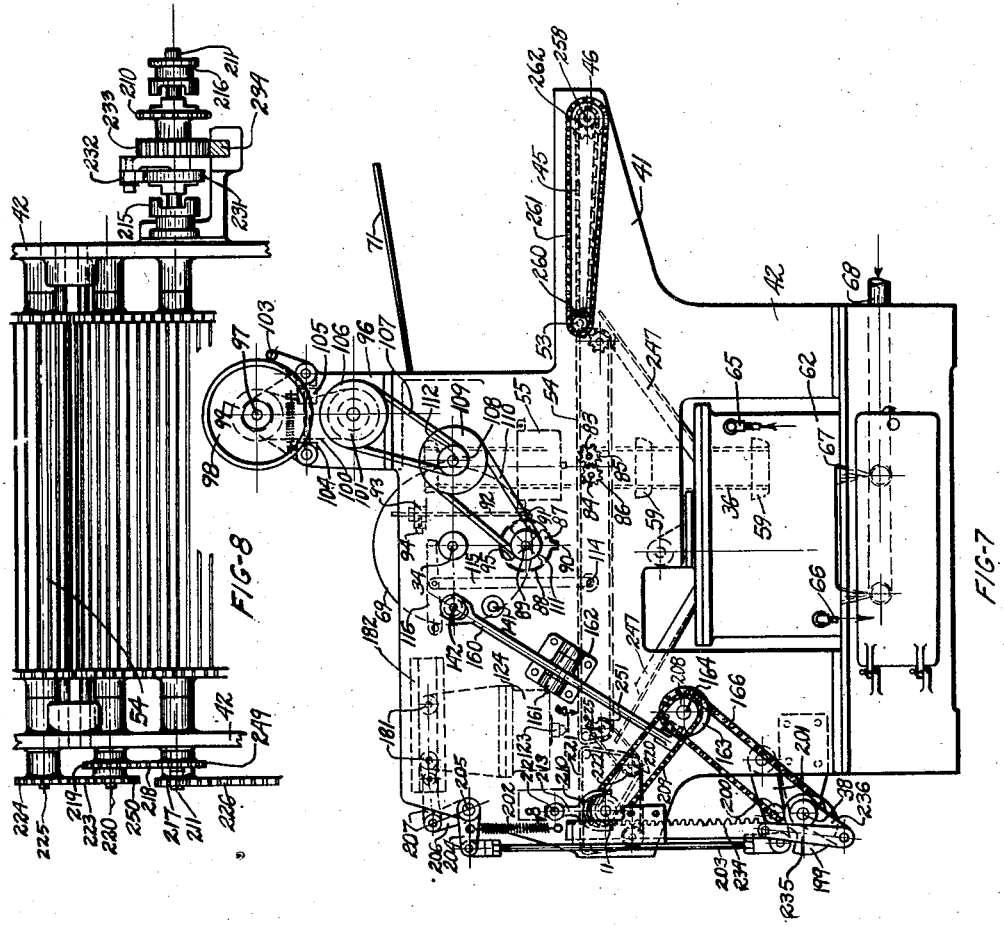

Feb. 22, 1927.  
D. PICCARDO  
1,618,471  
CANDY COATING MACHINE  
Filed Oct. 15, 1923   8 Sheets-Sheet 4
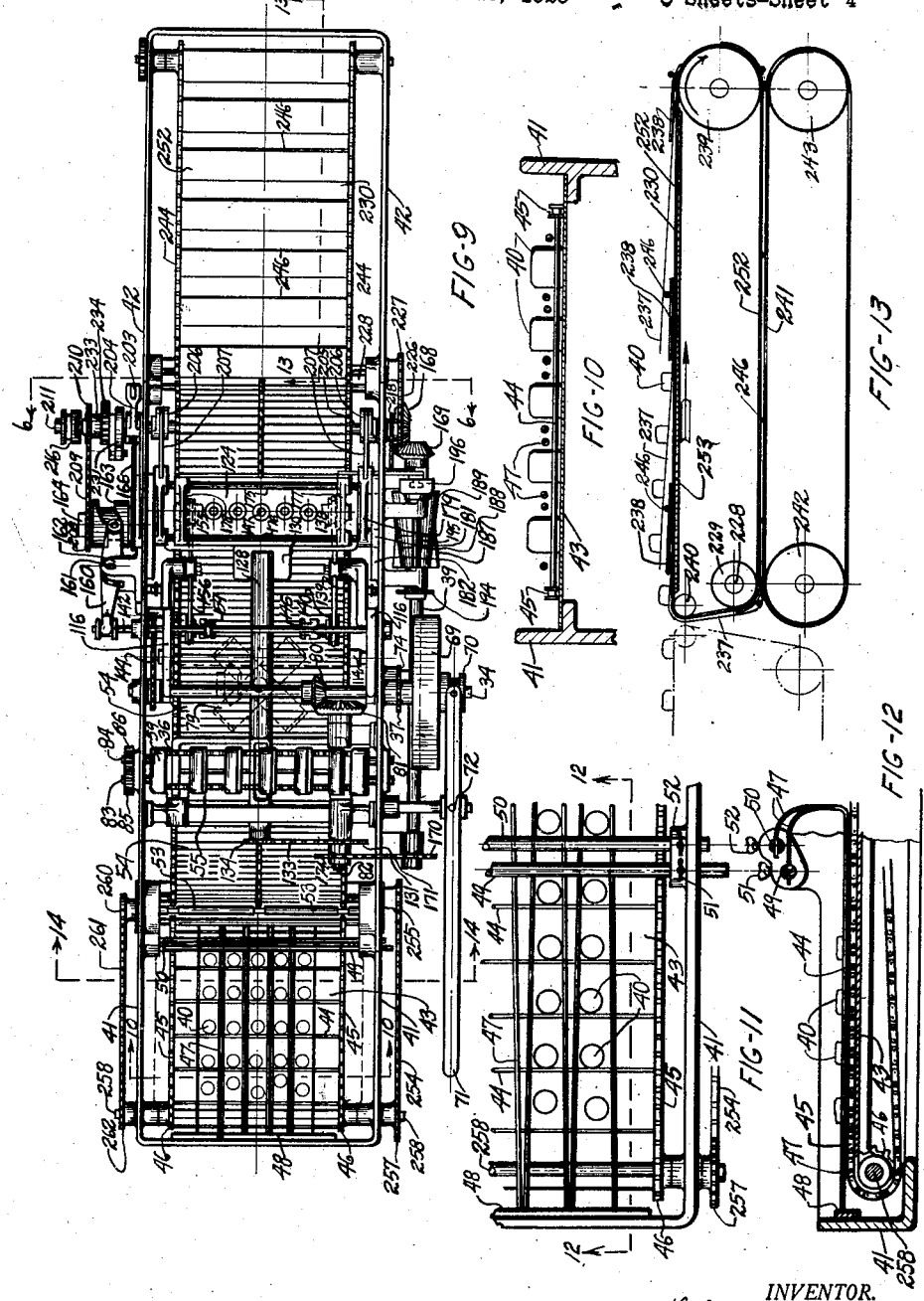
INVENTOR.  
Dionisio Piccardo  
BY Emanuel Scheyer  
ATTORNEY

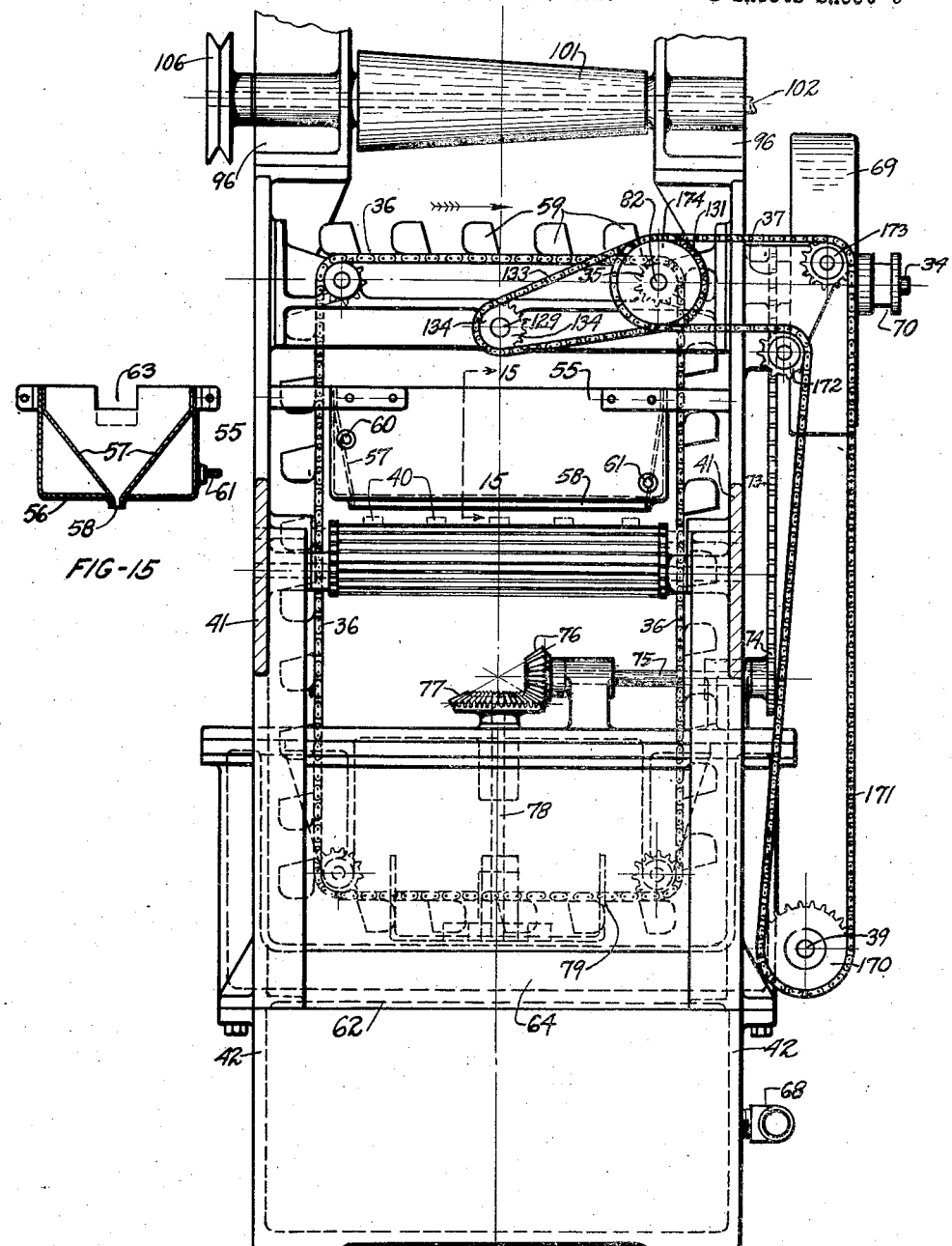

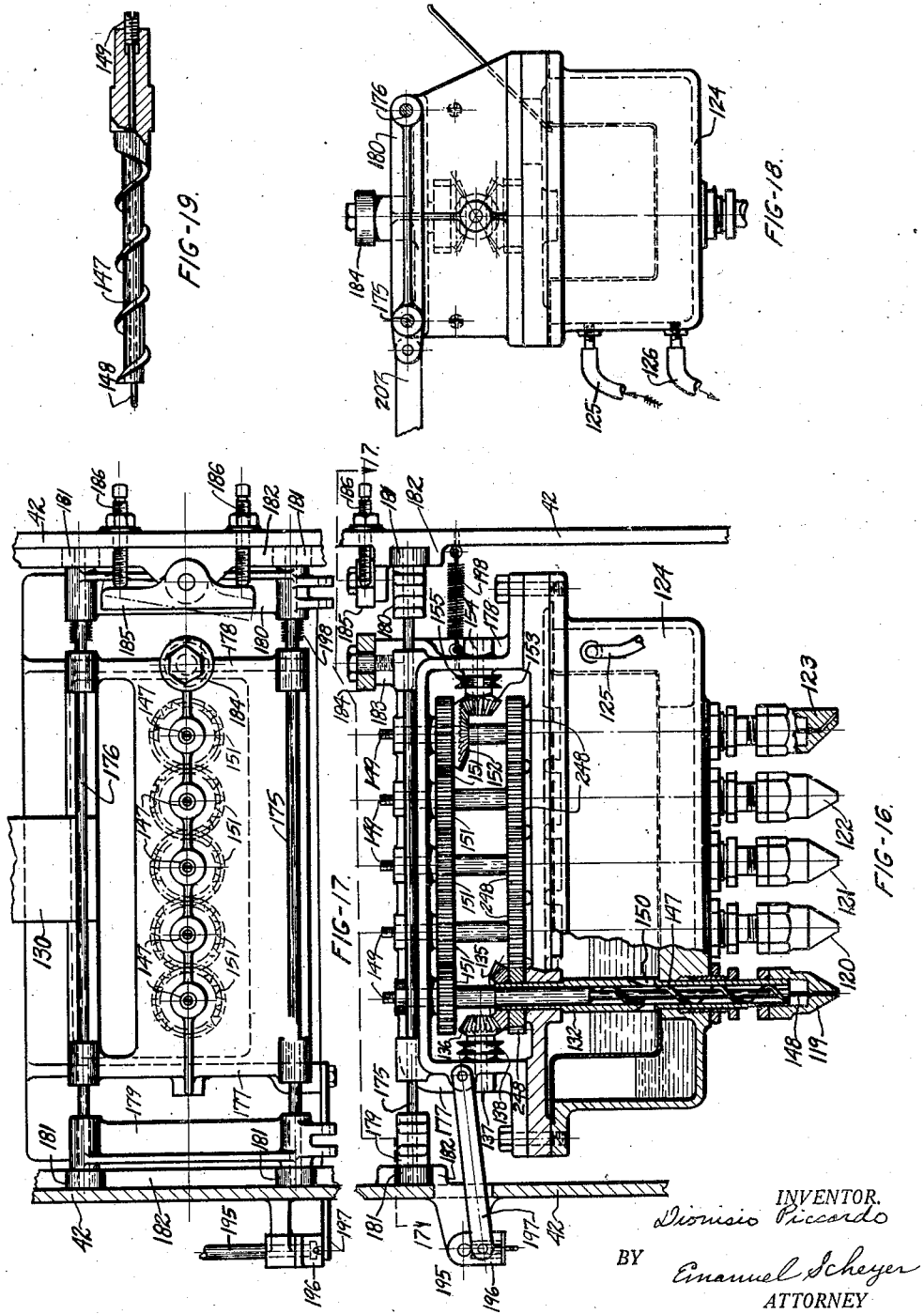

Feb. 22, 1927.

D. PICCARDO 1,618,471

CANDY COATING MACHINE

Filed Oct. 15, 1923

8 Sheets-Sheet 7

INVENTOR.
Dionisio Piccardo
BY
Emanuel Scheyer
ATTORNEY

Feb. 22, 1927.
D. PICCARDO
CANDY COATING MACHINE
Filed Oct. 15, 1923
1,618,471
8 Sheets-Sheet 8
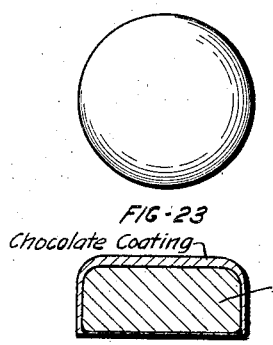
FIG-23
Chocolate Coating
FIG-22
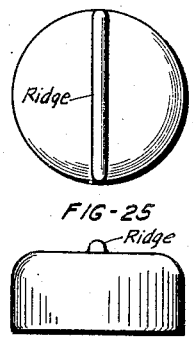
FIG-25
FIG-24
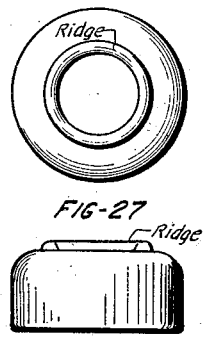
FIG-27
FIG-26
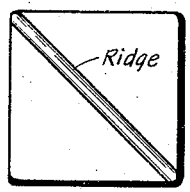
FIG-28
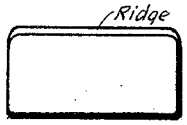
FIG-29
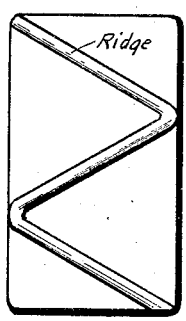
FIG-30
FIG-31
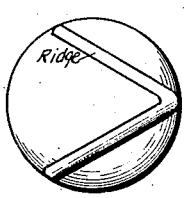
FIG-32
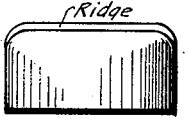
FIG-33
INVENTOR
Dionisio Piccardo
BY
Emanuel Scheyer
ATTORNEY Patented Feb. 22, 1927.

1,618,471

UNITED STATES PATENT OFFICE.

DIONISIO PICCARDO, OF NEW YORK, N. Y.

CANDY-COATING MACHINE.

Application filed October 15, 1923. Serial No. 668,644.

My invention relates to machines for coating candies with chocolate or other material and for forming various markings thereon.

My invention has for one of its several objects the provision of marking means so constructed and operated that the marking ridge formed on the candy need only be formed on the top of the candy and not slop down over the sides as is the case with present machines. The feed of the candies and the motions of the marking means are such that a large variety of markings can be obtained. I provide a conveyor for feeding in the candies into the machine which will automatically position the candies transversely under the marking means, no matter how the candies may be set upon said conveyor. The feeding in conveyor also automatically spaces the candies longitudinally. My marking means consists essentially of spouts suitably mounted to be given a variety of motions. The chocolate or other coating material is fed through the spouts by positive means which can shut off the flow at predetermined intervals. In addition to the feeding conveyor, I provide another conveyor which moves the candies received from the feeding in conveyor under a chocolate coating tank and from there under the marking spouts. This conveyor is adapted to have its motion stopped at predetermined intervals while the marking spouts are moved over the candies. Other forms of marking can be accomplished when both conveyor and spouts move simultaneously.

A further object of my invention is the provision of means for setting the candies after they have been suitably coated and marked upon sheets of paper so that the candies always come a sufficient distance back from the edge of the paper. With present machines the candies come out often on the edge of the paper so that part of the candy projects off the paper. This is a constant source of trouble and requires an operator's time to reset the candies not fed properly on the paper.

Figure 20:
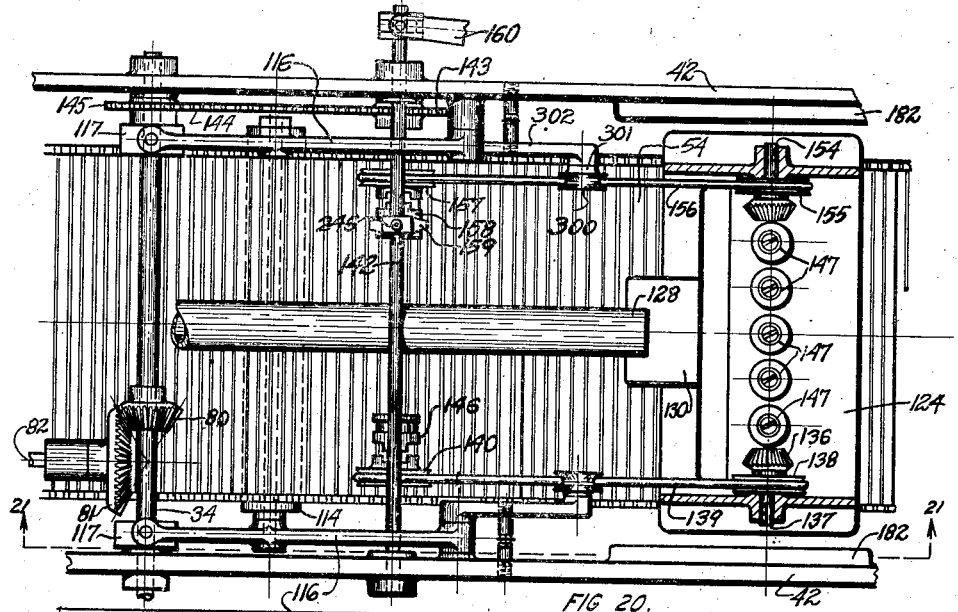
Figure 21:
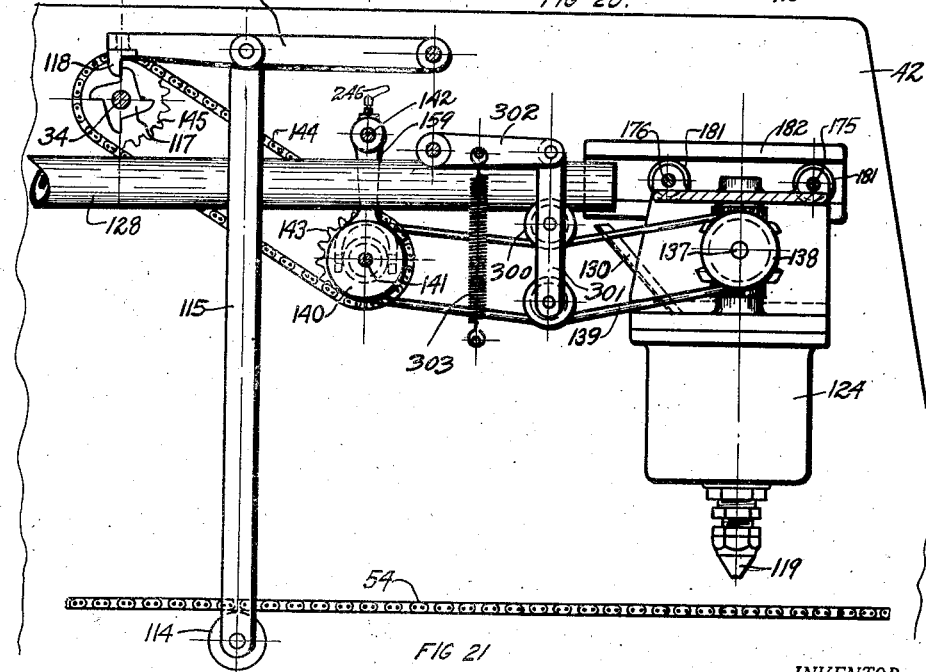

These and other objects and advantages are attained as shown by the following description and by the construction illustrated in the accompanying drawings of which:

Figure 1 is a side elevation of the machine, Fig. 2 is an enlarged detail view of the main chocolate feed screw, Fig. 3 is an end view of the main chocolate feed screw looking along the line 3—3 of Fig. 2, Fig. 4 is a cross section of the main chocolate feed screw taken along the line 4—4 of Fig. 2, Fig. 5 is a cross section of the chocolate feed screw taken along the line 5—5 of Fig. 2, Fig. 6 is an end elevation of Fig. 1 with the paper mounting conveyor removed, Fig. 7 is a side elevation opposite to that of Fig. 1, Fig. 8 is a partial and enlarged plan view taken along the line 8—8 of Figs. 6 and 7, Fig. 9 is a plan of the machine with blower and its drive omitted, Fig. 10 is a cross section of the feeding in conveyor taken along the line 10—10 of Fig. 9, Fig. 11 is a partial and enlarged plan view of the feeding in conveyor, Fig. 12 is a cross section taken along the line 12—12 of Fig. 11, Fig. 13 is a diagrammatic cross section of the paper mounting conveyor taken along the line 13—13 of Fig. 9, Fig. 14 is an end elevation of the machine taken along the line 14—14 of Fig. 1 with main clutch throwing lever and parts of the supporting frames omitted as well as the feeding in conveyor, Fig. 15 is a cross section of the chocolate coating tank taken along the line 15—15 of Fig. 14, Fig. 16 is a partial section of the machine showing the marking devices, Fig. 17 is a plan view of the marking devices taken along the line 17—17 of Fig. 16, Fig. 18 is an end elevation of the marking tank and devices with the spouts omitted, Fig. 19 is a detail of the chocolate feed screw for the marking spouts, Fig. 20 is an enlarged plan view showing the marking tank, the driving mechanism of the marking spouts and the feed screws for said spouts and the shaker for the candy conveyor, certain gears and parts being omitted above the marking tank for clarity, Fig. 21 is a view taken along the line 21—21 of Fig. 20, Fig. 22 is a cross section of a candy showing a plain chocolate coating, Fig. 23 is a plan of the candy shown in Fig. 22, Fig. 24 is an elevation of a candy with a chocolate coating having a simple ridge mark thereon, Fig. 25 is a plan view of the candy of Fig. 24, Fig. 26 is an elevation of a candy with a chocolate coating having a circular ridge mark thereon, Fig. 27 is a plan view of the candy of Fig. 26, Fig. 28 is a plan view of a rectangular candy showing a diagonal ridge on the chocolate coating, Fig. 29 is an elevation of the candy shown in Fig. 28, Fig. 30 is a plan view of a candy showing a zigzag ridge on the chocolate coating, Fig. 31 is an elevation of the candy shown in Fig. 30, Fig. 32 is a plan view of a candy with a V shaped ridge on its chocolate coating and Fig. 33 is an elevation of the candy shown in Fig. 32.

The conveying mechanism for feeding the candies 40 into the machine is supported on brackets 41 projecting from the main frames 42 of the machine. (Figs. 1, 7, 9, 10, 11 and 12). Adapted to move over a stationary surface 43 are cross wires 44 fastened at each end to a chain 45. When chains 45 are carried around over their sprockets, one of which is shown at 46, Fig. 12, they carry cross wires 44 with them. Substantially at right angles to cross wires 44 and above them are rods 47. One end of each rod 47 is loosely fastened into a bar 48 rigidly attached to bracket 41. The other ends of rods 47 are fastened to bars 49 and 50, these ends alternating in their attachment to bars 49 and 50, that is every other rod 47 being fastened to bar 49, the remaining bars being fastened to bar 50. The bars 49 and 50 are slidably mounted at each end in suitable bearings in brackets 41.

When bars 49 and 50 are slid transversely they carry with them the ends of their corresponding rods 47, rods 47 pivoting in their supports in bar 48 so that every alternate rod 47 is moved at an angle with its neighbor. Set screws 51 and 52 (Fig. 11) hold their respective bars 49 and 50 in any desired transverse position. The object of the adjustable rods 47 is properly to position transversely the candies 40 as they are fed into the machine. With this construction, the operator can set candies 40 at random near the left end of the feeding mechanism (Figs. 1, 9, 11 and 12), the movement to the right of cross wires 44 spacing them uniformly apart in a longitudinal direction by the time they reach the right hand end of the feeding mechanism. Rods 47 cause the candies 40 to be properly positioned transversely as candies 40 are pushed along to the right against them by cross wires 44.

When candies 40 reach the extreme right of the feeding mechanism, they are pushed on rollers 53 which send them on to the conveyor 54. Rollers 53 carry sprocket 260 fixed to one end. Chain 261 meshes with sprocket 260 and sprocket 262 fixed to shaft 258. Shaft 258 drives chains 45 as will be explained later (Figs. 7 and 9). Conveyor 54 carries candies 40 under the chocolate coating tank 55. Tank 55 has double walls, an outer wall 56 and inner walls 57 (Figs. 14 and 15). At the bottom of tank 55 is a slot 58 which extends transversely practically for the full width of conveyor 54. The chocolate is deposited in tank 55 by buckets 59 carried around on an endless chain 36. By means of steam in the space between walls 56 and 57 of tank 55, the chocolate is kept in a fluid condition. The steam enters through pipe 60 and leaves through pipe 61. A notch 63 (Fig. 15) is left in one side of tank 55 to act as an overflow should the chocolate be carried into tank 55 faster than it leaves.

Buckets 59 on their lower run dip into chocolate vat 62 supported on the lower portion of the main frames 42 of the machine. Vat 62 is provided with a steam jacket 64, the steam entering by pipe 65 and leaving by pipe 66. When the machine is in operation vat 62 is heated by steam as just described. When the machine is idle, in order to prevent caking of the chocolate, jacket 64 is heated by gas jets 67 supplied with gas through pipe 68.

The main driving power for the machine is supplied to pulley 69 by means of a power driven belt (not shown). Pulley 69 is loosely mounted on shaft 34. A clutch 70 is feathered on shaft 34 and is adapted to be thrown into and out of engagement with pulley 69, by clutch lever 71 fulcrumed on pivot 72 (Figs. 1, 9 and 14). Shaft 34 carries fixed upon it, a sprocket 37 over which chain 73 passes. The lower end of chain 73 engages a sprocket 74 fixed to one end of shaft 75 (Fig. 14). The other end of shaft 75 carries bevel gear 76 which mates with bevel gear 77 fixed to the top of vertical shaft 78. A mixer paddle 79 is carried by shaft 78 at its lower end.

Bevel gear 80 (Fig. 9) is fixed to shaft 34. Meshing with bevel gear 80 is bevel gear 81 fixed to shaft 82 (Figs. 9 and 14). Shaft 82 carries fixed upon it sprocket wheel 35 (Fig. 14) which meshes with chain 36 carrying buckets 59.

Located under conveyor 54, in a vertical plane with slot 58 of chocolate tank 55, are rollers 83 and 84 (Figs. 1, 7 and 9). Roller 83 carries a sprocket wheel 113 which is driven by the chain of conveyor 54. A gear 85 on the end of roller 83 engages with gear 86 on the end of roller 84.

By this arrangement rollers 83 and 84 are caused to rotate in opposite directions and towards each other. Chocolate falling from tank 55 between the rollers 83 and 84 is caused to be pushed up and to coat the bottom of candies 40 as they pass by.

Candies 40, after passing chocolate coating tank 55, are conveyed under blower 87 (Figs. 1 and 7). Blower 87 has its casing 88 loosely mounted on shaft 89. Casing 88 has a lug 91 projecting from one side of it. Rod 92 is pivotally fastened at its lower end to lug 91. The upper end of rod 92 passes through lug 93 of frame 42. By means of set screw 94, the vertical position of rod 92 can be adjusted thereby adjusting the inclination of spout 90. Rotor 95 of blower 87 is fixed upon shaft 89 and rotates with it. The function of blower 87 is to send a stream of air upon the candies 40 as they pass, whereby the chocolate coating received by the candies from tank 55 can be reduced in thickness. By varying the inclination of spout 90, this thickness can be controlled. The thickness can also be controlled by varying the speed of rotor 95. The driving mechanism for rotor 95 will now be described.

Brackets 96 (Figs. 1, 6 and 7) are fastened to the tops of frames 42. Mounted in suitable bearings in brackets 96, is a shaft 97 which carries a pulley 98 fixed to one end. Pulley 98 is adapted to be driven by a belt (not shown) from a suitable source of power. Shaft 97 also has fixed upon it belt cone 99. Below cone 99 is a corresponding cone 101 fixed upon shaft 102. A belt 100 connects cones 99 and 101. The various parts of the belt shifting mechanism, which is well known to the art, are denoted by numerals 103, 104 and 105. Pulley 106 is fixed to the end of shaft 102. Belt 107 travels over pulleys 106 and 108. Pulley 108 is fixed to shaft 112 which carries also fixed to it, pulley 109. Belt 110 travels over pulleys 109 and 111. Pulley 111 is fixed to shaft 89, the same shaft which carries rotor 95.

To provide further for the even coating of candies 40, conveyor 54 is given a vertical shaking motion by means of roller 114 which extends transversely under the upper run of said conveyor. Roller 114 is rotatably mounted in links 115 near their bottom, one link 115 being located on each side of conveyor 54 (Figs. 1, 20 and 21). Each link 115 is pivotally connected to a horizontal link 116 pivotally mounted in frame 42. Each link 116 has a downwardly projecting lug 118 on its free end. Shaft 34 carries fixed to it two toothed cams 117 against which lugs 118 are adapted to bear. The rotation of cams 117 rocks links 116 and through the chain of connections just recited, shakes roller 114. After candies 40 pass shaker roller 114 they are carried under marking spouts 119, 120, 121, 122 and 123. The said spouts with the mechanism about to be described are used to form ridges of chocolate on the candies such as are illustrated in Figs. 24 to 33 inclusive.

Spouts 119 etc. receive their chocolate from a double walled tank 124 having inlet and outlet steam pipes 125 and 126 respectively (Figs. 16, 17 and 18). Buckets 59, besides emptying their contents into tank 55, spill some of it into opening 127 of feed tube 128 (Figs. 1 and 2). Located within feed tube 128 is feed screw 129 whose rotation forces the chocolate entering opening 127 to the other end of feed tube 128 where it spills out upon chute 130 and runs into tank 124 (Figs. 20 and 21). Shaft 82 which carries sprocket 35 for turning bucket chain 36, also carries a sprocket 131 which drives chain 133 (Figs. 9 and 14). Chain 133 meshes with sprocket 134 fixed to feed screw 129. Located within tank 124 are five vertical tubes one of which is shown at 132 Fig. 16, each of the spouts 119, 120 etc. being mounted on such a tube. Tubes 132 are rotatably mounted in the upper and lower portions of tank 124. Near the upper end of each tube 132 a gear 248 is carried. Tube 132 for spout 119 carries fixed to it bevel gear 135 which meshes with bevel gear 136 fixed to short shaft 137 (Figs. 16 and 20). Pulley 138 is also fixed to short shaft 137. A belt 139 driven by pulley 140 on shaft 141, drives pulley 138. Shaft 141 carries sprocket 143 fixed upon it. A chain 144 meshes with sprocket 143 and sprocket 145 fixed on shaft 34 (Figs. 20 and 21). Pulley 140 is loosely mounted on shaft 141, but when it is desired to rotate spouts 119, 120 etc. sliding clutch 146 feathered to shaft 141, is moved into engagement by hand with pulley 140. Sliding clutch 146 is maintained in its several positions on shaft 141 by means of a set screw (not shown).

When it is desired to rotate the spouts, they all must be of the type of spout 123 (Fig. 16). Spouts of the type of spout 119 are not adapted to produce circular marking when rotated. The spouts are removable and either type of spout can be used depending upon the character of the marking desired. An example of the marking produced by rotating a spout of the type of spout 123 is to be seen in Fig. 27.

Located within each tube 132 is a feed screw 147. A valve rod 148 is set in a hole bored through the entire length of feed screw 147. The upper end of valve rod 148 is enlarged and threaded to form a screw 149 which is screwed into a corresponding thread in feed screw 147. Each of spouts 119, 120 etc. is formed with a beveled valve seat to and from which the point of valve rod 148 can be screwed thereby regulating the rate of the flow of the chocolate from the spouts. Holes as shown at 150 are left in each tube 132 whereby the chocolate in tank 124 can enter tubes 132. The rotation of feed screws 147 forces this chocolate out of spouts 119, 120 etc. Each feed screw 147 carries fixed upon it near its upper end, a gear 151. Gears 151 mesh with each other. Feed screw 147 for spout 123 carries fixed to it bevel gear 152 which meshes with bevel gear 153 fixed to short shaft 154. Pulley 155 is also fixed to short shaft 154. Belt 156 passes over pulley 155 and pulley 157 loose on shaft 141 (Figs. 20 and 21).

Belts 139 and 156 are kept tensioned by means of tension rollers 300 rotatably mounted on links 301 (Figs. 20 and 21). Links 301 are pin connected to links 302 pivotally mounted on supporting frames 42. Each link 302 is kept down under tension as well as rollers 300 by means of tension springs 303 connecting links 302 with frames 42. This construction permits tensioning of belts 139 and 156 for various longitudinal positions of tank 124. Clutch 158 is feathered to shaft 141. Directly above shaft 141, is located a shaft 142 slidably mounted in main frames 42. Clutch shifting fork 159 is carried by shaft 142, its fork engaging with clutch 158. When shaft 142 is shifted in one direction, clutch 158 is disengaged from pulley 157, and when shifted in the opposite direction clutch 158 is engaged with pulley 157 thereby driving pulley 155 through belt 156 and causing feed screws 147 to revolve. At predetermined intervals, as will be explained later, shaft 142 is shifted to cause the disengagement of clutch 158 from pulley 157. Lever 160, (Figs. 6, 7, 9 and 20) is suitably connected, by means well known to the art, to the end of shaft 142 to permit said lever to rotate about its fulcrum pin 161 mounted in bearings 162 attached to frame 42. The lower end of lever 160 carries a roller which operates in the groove of cam 163 fixed to shaft 164. Sprocket 165 with which chain 166 engages, is also fixed to shaft 164. The lower end of chain 166 engages with sprocket 167 (Fig. 6) fixed to shaft 38. Fixed to one end of shaft 38 is a bevel gear 168 which meshes with bevel gear 169 fixed to one end of shaft 39 (Figs. 1, 6 and 9). Sprocket 170 is fixed to the opposite end of shaft 39. Chain 171 passes over sprocket 170, over idler sprockets 172 and 173 and sprocket 174 fixed to shaft 82 (Figs. 1, 9 and 14).

Tank 124 (Figs. 16, 17, 20 and 21) is held suspended from rods 175 and 176 in suitable bearings provided in brackets 177 and 178, permitting tank 124 to be moved transversely between frames 42. Rods 175 and 176 are held in spaced relation by means of braces 179 and 180. The ends of rods 175 and 176 are provided with rollers 181 which travel along ledges 182 provided on frames 42. Bracket 178 (Fig. 16) is provided with a lug 183 on which is mounted a roller 184. Cam 185 (Fig. 17) is pivotally mounted on a bracket formed on frame 42, the inclination of the cam being controlled by screws 186. As will be explained later, roller 184 can be made to press against cam 185 by means of spring 198 causing tank 124 to be given an inclined motion as rods 175 and 176 are given a longitudinal one. Tank 124 is adapted to be given its various motions so as to enable spouts 119, 120 etc. to mark candies 40 with various designs, some of which are shown in Figs. 28, 30 and 32.

The mechanism for causing the transverse motion of tank 124 is as follows:—Fixed to the shaft 39 is a belt cone 187 (Figs. 1 and 9) over which a belt 188 runs. Belt 188 also runs on cone 189 fixed upon short shaft 190. Belt shifting mechanism 191 is for the purpose of varying the speed ratio of cones 187 and 189. Fixed to the end of the short shaft 190 is sprocket 192 over which chain 193 passes. The upper end of chain 193 engages sprocket 194 fixed to shaft 195. The other end of shaft 195 carries the slotted crank 196 (Figs. 1, 6, 16 and 17) to which is pivotally connected pitman 197. Pitman 197 is also pin connected to bracket 177 on tank 124. The length of stroke of pitman 197 can be varied by fastening it in various positions in the slot of crank 196. When it is desired that the tank 124 have no transverse motion, pitman 197 is disconnected by hand from bracket 177, in which event spring 198 will pull the tank over so that roller 184 bears against cam 185.

The mechanism for causing the longitudinal motion of tank 124 is as follows:— Wiper cam 199 (Figs. 6 and 7) is fixed on shaft 38. Roller 200 carried by link 201 pivotally mounted upon frame 42 rolls upon the surface of wiper cam 199, and is held down in engagement with it by means of spring 202. Pin connected to the end of link 201 is a vertical rod 203 seen in Figs. 1 and 7 and shown with its central portion broken away in Fig. 6. The upper end of vertical rod 203 is pin connected to crank 204 fixed to shaft 205. Shaft 205 carries fixed to it two cranks 206. Each crank 206 is pin connected to a pitman 207 which is in turn pin connected to braces 177 and 178 of tank 124. When it is desired that tank 124 be given no longitudinal motion as would be the case for marking the candies 40 as shown in Fig. 27, vertical rod 203 can be disconnected from crank 201 by withdrawing the pin between them.

For certain markings on candies 40 such as that shown in Fig. 25, conveyor 54 can be kept in continuous motion while the marking spouts 119, 120 etc. are emitting chocolate. For other markings such as that shown in Fig. 27, conveyor 54 must be brought to a standstill under said spouts. The mechanism for moving conveyor 54 is as follows:—Fixed to the end of shaft 164 is a sprocket 208, with which chain 209 engages. (Figs. 6, 7 and 9). The upper end of chain 209 passes over sprocket 210 loose on shaft 211. See also Fig. 8. Located directly above shaft 211 is a clutch bar 212 (Figs. 6 and 7) carrying fixed to it clutch shifting arms 213 and 214 with forked lower ends adapted to engage with clutches 215 and 216 feathered to shaft 211. When clutch 216 is thrown into engageemnt with sprocket 210, shaft 211 is caused to have continuous rotation. Near the other end of shaft 211 is fixed a sprocket 249 (Fig. 8). Passing over sprocket 249 is a chain 218 which engages with a sprocket 219 fixed to a shaft 220. Shaft 220 carries sprockets one of which is seen at 222 Fig. 7, which engage with the chains of conveyor 221. Shaft 220 also carries a sprocket 250 over which chain 223 passes. The other end of chain 223 passes over a sprocket 224 fixed to shaft 225. Shaft 225 carries sprockets one of which is seen at 251 (Fig. 7) which engage with the chains of conveyor 54. Sprocket 217 fixed to shaft 211 engages a chain 226 the other end of which passes over a sprocket 227 fixed to shaft 228. Fixed to shaft 228 are sprockets (not seen) which drive chains 244 of the paper mounting conveyor 230. Cross wires 246 connect chains 244. A canvas or oil cloth belt 252 is fastened between chains 244. Belt 252 runs over a stationary support 253. When clutch 215 is thrown into engagement with ratchet wheel 231 (Fig. 8) conveyors 45, 54, 221 and 230 are given an intermittent feeding motion. The feeding in conveyor is driven by chain 254 which meshes with sprocket 255 fixed to shaft 256. Shaft 256 has sprockets fixed to it (not shown) which are driven by the chains of conveyor 54. The other end of chain 254 meshes with sprocket 257 fixed to shaft 258 which carries sprockets 46 (Fig. 12) meshing with chains 45. Ratchet wheel 231 is loose on shaft 211. Pawl 232 is carried by gear 233 which is also loose on shaft 211. Rack 234 (Figs. 6, 7 and 8) meshes with gear 233. When rack 234 is reciprocated as will be explained, gear 233 is rotated back and forth. The teeth (not seen) on ratchet wheel 231 are so cut that pawl 232 only actuates it when said pawl moves on its upward stroke. The lower end of rack 234 is pin connected to pitman 235, which in turn is pin connected to crank 236 fixed to shaft 38.

After candies 40 pass from under marking sprouts 119, 120 etc., they are pushed upon conveyor 221. Conveyor 54 because of the chocolate dripping upon it from tank 55 is very messy. By passing candies 40 to conveyor 221, no excess chocolate is present when the candies come upon paper sheet 237 mounted upon conveyor 230. Conveyor 230 is provided with flaps 238 (Fig. 13) under which the forward ends of paper sheets 237 are inserted. Because all the conveyors of the machine are geared together, their movements are in spaced relation, whereby it is predetermined that when candies 40 come upon a paper sheet 237 they do not come partly off its edge but a reasonable distance back therefrom. Paper sheets 237 when covered with candies are removed from conveyor 230 by hand and fresh sheets inserted. Conveyor 230 passes over rollers 239, 229 and 240. In order to retain paper sheets 237 in place, the lower run of belt 252 is held up by the upper run of canvas belt 241 running on rollers 242 and 243.

The operation of the machine is as follows:—Lever 71 is moved throwing in clutch 70 and starting the motion of the various parts of the machine. The candies 40 are placed at random on surface 43 of the feeding in conveyor. Wires 44 as they move along, space the candies longitudinally and wires 47 get them in transverse alignment with marking spouts 119, 120, etc. The candies pass over rolls 53 on to conveyor 54 which has its driving mechanism set so that it is in constant motion when plain candies as in Fig. 23 are desired or when candies marked as in Figs. 25, 30 and 32 are desired. For conveyor 54, and the other conveyors geared to it as hereinbefore described, to be in constant motion, clutch 216 is set in engagement with sprocket 210. Conveyor 54 moves the candies under slot 58 of chocolate tank 55 which causes their tops and sides to be coated with chocolate, the bottom of the candies receiving their coating by passing over rolls 83 and 84. Passing on still further, the candies come under the action of blower 87, whereby their coating is evened off and reduced to the desired thickness. The candies then pass under marking spouts 119, 120, etc., which are adapted if desired to have their chocolate feed screws 147 operate so that chocolate is only emitted during the time that the tops of the candies are under the spouts, the chocolate feed being controlled by the action of cam 163. When it is desired to have the spouts discharge chocolate continuously, set screw 246 (Fig. 21) is released from shaft 142 and clutch 158 held into engagement with pulley 157 (Fig. 20) by means of a set screw (not seen) on shaft 141. After passing from under the marking spouts, the candies are transferred to conveyor 221 from whence they pass upon sheets of paper 237 carried by paper mounting conveyor 230. The sheets of paper with the candies thereon are then removed by hand for packing.

If it be desired to mark the candies as in Figs. 27 and 28, the conveyors must be stopped at intervals with a row of candies under the marking spouts, and the marking spouts then be given their desired motion. In the case of the circular marking of Fig. 27, all the spouts are of the form of spout 123, Fig. 16. By setting clutch 146 in engagement with pulley 140, the spouts are kept in rotation, the chocolate only being discharged for an interval long enough to form a complete circle, the discharge as explained before being controlled by feed screws 147 and cam 163. For a diagonal marking as in Fig. 28, the spouts are kept from rotation, but the entire marking tank and spouts are given a diagonal stroke while the feed screws are discharging chocolate and the conveyors are stationary with a row of candies under the stroke of the spouts. Upon the return stroke the conveyors move forward again bringing the next row of candies in place. The diagonal stroke is governed by the inclination of cam 185 (Figs. 16 and 17). The longitudinal motion of the marking tank 124 and its spouts is controlled by wiper cam 199 (Fig. 7) whose action is brought into play when once vertical rod 203 is manually connected to crank 201 by inserting the pin between them.

When it is desired to give the candies marking as shown in Figs. 30 and 32, the conveyors are caused to be given continuous motion by setting clutch 216 in engagement with sprocket 210 and bringing about a reciprocating transverse motion of marking tank 124 and its spouts. Normally when the reciprocating transverse motion of marking tank 124 is not required, pitman 197 is disconnected from frame 177 (Figs. 16 and 17) which permits spring 198 to hold said tank to the right, cam 185 being set parallel to frame 42. When pitman 197 is connected to frame 177, the rotation of crank 196 on shaft 195 causes the reciprocation of marking tank 124 and its spouts, the length of stroke being controlled by the position of one end of pitman 197 in the slot of crank 196.

Any excess chocolate from tank 55 and conveyor 54 drips down upon inclined guides 247 from whence it runs back into vat 62.

The forms of marking shown on the candies in Figs. 24 to 33 are merely by way of example. Other forms can be obtained by varying the length of stroke of the transverse motion, the speed of the conveyors and of transverse stroke and the shape and inclination of cam 185.

I claim:—

1. In a device of the character described, mechanism for depositing ridges of candy coating material comprising a plurality of spouts rotatably mounted, mechanism for rotating said spouts, said spouts having their discharge openings eccentric to their axes of rotation and means for causing intermittent relative feeding motion between a plurality of candies and said spouts, said feeding motion taking place only at predetermined intervals relatively to the rotation of the spouts.

2. In a device of the character described, a plurality of spouts rotatably mounted, said spouts having their discharge openings eccentric to their axes of rotation, mechanism for rotating said spouts, mechanism for feeding candy coating material through said spouts at intervals, supporting means for holding a plurality of candies, mechanism for causing intermittent relative feeding motion of the supporting means and said spouts, said mechanisms being suitably timed that a circular ridge of candy coating material is deposited upon the candy during the time there is no relative feeding motion of the supporting means and the spouts.

3. In a device of the character described, means adapted to discharge candy coating material in a plurality of spaced streams at intervals, a conveyor adapted to feed a plurality of candies under said streams, ways upon which said discharging means are mounted adapted to permit resultant motion of said means having component motions simultaneously in both transverse and parallel directions to the feed of the candies, separate ways each for the transverse motion and the parallel motion, the ways for one motion being carried by and movable along the ways of the other motion, means adapted to shape the path of travel of said discharging means, and mechanism adapted to effect the motion of said discharging means along said path, the intervals during which coating material is discharged and the feeding of the candies in timed relationship.

4. In a device of the character described, mechanism for discharging a plurality of spaced streams of candy coating material, comprising a tank for holding a supply of said material and a plurality of tubes communicating therewith through which the material is discharged, means for moving about said tank with its tubes over a plurality of candies whereby said candies are marked with ridges of a predetermined design, a stationary container for holding said material, and mechanism for feeding the candy coating material from said container to said tank irrespective of its position.

5. In a device of the character described means adapted to discharge candy coating material in a plurality of spaced streams, a conveyor for intermittently feeding a plurality of candies under said streams, ways upon which said discharging means are mounted adapted to permit resultant motion of said means having component motions simultaneously in both transverse and parallel directions to the feed of the candies, mechanism adapted to shape the path of travel of said discharging means, and mechanism adapted to effect the motion of said discharging means along said path and the feeding of the candies at predetermined intervals to the motion of said discharging means.

6. In a device of the character described, a plurality of spouts rotatably mounted, said spouts having their discharge openings eccentric to their axes of rotation, mechanism for rotating said spouts and mechanism for feeding candy coating material through said spouts at intervals, the length of said intervals being substantially equal to the time for a complete revolution of said spouts.

7. In a device of the character described, mechanism for discharging a plurality of spaced streams of candy coating material comprising a tank for holding a supply of said material and a plurality of tubes communicating therewith through which the material is discharged, means for moving about said tank with its tubes over a plurality of candies whereby said candies are marked with a predetermined design, a stationary container for holding said material, a pipe leading from said container toward said tank, said tank being provided with a catchment adapted to come under one end of said pipe, said catchment being of sufficient extent to come under the end of said pipe for various positions of said tank, and means for sending the material in said container through said pipe.

8. In a device as claimed in claim 9 in which the catchment consists of a chute extending upward from an opening in said tank for receiving the material discharged from the end of said tube.

9. In a device of the character described, mechanism for discharging a plurality of spaced streams of candy coating material comprising a tank for holding a supply of said material and a plurality of tubes communicating therewith through which the material is discharged, means for moving about said tank with its tubes over a plurality of candies whereby said candies are marked with a predetermined design, a stationary container for holding said material, a pipe leading from a point over said container toward said tank, the end of said pipe over said container being partly cut away on its upper side, a bucket chain adapted to dip into said container and convey the material therein into the cut away portion of the pipe, said tank being adapted in various positions to receive the material from its end of the pipe.

10. In a device of the character described, means adapted to discharge candy coating material in a plurality of spaced streams, a conveyor adapted to feed a plurality of candies under said streams, ways upon which said discharging means are mounted adapted to permit resultant motion of said means having component motions simultaneously in both transverse and parallel directions to the feed of the candies, mechanism adapted to reciprocate said discharging means in the parallel direction, an adjustably set guide cam, spring means adapted to press said discharging means laterally against said cam whereby when said discharging means is given its parallel component motion said cam effects its transverse component motion.

DIONISIO PICCARDO.